(12) United States Patent
Marupaduga et al.

(10) Patent No.: US 10,932,163 B1
(45) Date of Patent: Feb. 23, 2021

(54) CONTROLLING HANDOVER BASED ON SOURCE AND TARGET CAPABILITIES WITH RESPECT TO DUAL CONNECTIVITY

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/518,235

(22) Filed: Jul. 22, 2019

(51) Int. Cl.
*H04W 4/00* (2018.01)
*H04W 36/00* (2009.01)
*H04W 36/08* (2009.01)
*H04W 88/10* (2009.01)

(52) U.S. Cl.
CPC ... *H04W 36/0016* (2013.01); *H04W 36/0058* (2018.08); *H04W 36/0069* (2018.08); *H04W 36/00835* (2018.08); *H04W 36/08* (2013.01); *H04W 88/10* (2013.01)

(58) Field of Classification Search
CPC ............ H04W 36/08; H04W 36/0016; H04W 36/0058; H04W 36/0069; H04W 36/00835
See application file for complete search history.

(56) References Cited

U.S. PATENT DOCUMENTS

| | | | |
|---|---|---|---|
| 8,396,479 B2 | 3/2013 | Zhang et al. | |
| 9,883,436 B2 | 1/2018 | Brown et al. | |
| 10,327,181 B2 * | 6/2019 | Mitsui | H04W 36/0022 |
| 2020/0245401 A1 * | 7/2020 | Ingale | H04W 36/14 |

* cited by examiner

*Primary Examiner* — Bo Hui A Zhu (57) ABSTRACT

A method for controlling handover of a user equipment device (UE) between a first access node and a second access node. The first access node could select a handover process with the selecting being based on whether (i) the source access node and target access nodes are both dual-connectivity capable or both not dual-connectivity capable or rather (ii) one of the access nodes is dual-connectivity capable and the other of the access nodes is not dual-connectivity capable. For example, if both are dual-connectivity capable or not dual-connectivity capable, then the source access node could opt for X2 handover. Whereas if one is dual-connectivity capable and the other is not dual-connectivity capable, then the source access node could opt for S1 handover.

18 Claims, 3 Drawing Sheets

CONTROLLING HANDOVER BASED ON SOURCE AND TARGET CAPABILITIES WITH RESPECT TO DUAL CONNECTIVITY

BACKGROUND

A cellular wireless network typically includes a number of cell sites having access nodes (e.g., access nodes) each configured to provide radio frequency (RF) coverage defining a cell in which user equipment devices (UEs) such as cell phones, tablet computers, machine-type-communication devices, tracking devices, embedded wireless modules, and/or other wirelessly equipped communication devices (whether or not user operated) can operate. Further, each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has embraced various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each cell might operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each carrier could be structured to define various physical channels for carrying information between the access node and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each timeslot to define physical resource blocks (PRBs) in which the subcarriers can be modulated to carry data.

When a UE enters into coverage of an example network, the UE could detect threshold strong coverage of an access node (e.g., a threshold strong reference signal broadcast by the access node) on a particular carrier and could then engage in random-access and Radio Resource Control (RRC) signaling with the access node to establish an RRC connection through which the access node will serve the UE on that carrier.

Further, if the UE is not already registered for service with the core network, the UE could transmit to the access node an attach request, which the access node could forward to a core-network controller for processing. And the core-network controller could then coordinate setup for the UE of one or more bearers extending between the UE and a core-network gateway that provides transport-network connectivity.

Once the UE is so connected and registered, the access node could then serve the UE in a connected mode on the carrier, managing downlink air-interface communication of packet data to the UE and uplink air-interface communication of packet data from the UE. For example, when packet data for the UE arrives at the core network from a transport network, the data could flow to the UE's serving access node, and the access node could then schedule and provide transmission of that data to the UE on particular downlink air-interface resources of the carrier. Likewise, when the UE has data to transmit on the transport network, the UE could transmit a scheduling request to the access node, the access node could responsively schedule transmission of that data from the UE on particular uplink air-interface resources of the carrier, and the UE could accordingly transmit the data to the access node for forwarding through the core network to the transport network.

In addition, when a UE is so connected, the UE could work to ensure that the UE continues to be served by a sufficiently strong cell, and perhaps by the strongest available cell.

To facilitate this, the UE could regularly monitor reference-signal strength from its serving access node, and, perhaps upon detecting that that reference signal strength becomes threshold low, the UE could scan the airwaves in search of another cell with threshold strong (e.g., threshold stronger) coverage. Upon detecting such another cell, the UE could then transmit to its serving access node a measurement report that specifies the signal strength and the detected cell. And in response to the measurement report, the access node could engage in a process to hand over the UE from being served by the access node (source access node) to being served instead by the access node that provides the reported cell (target access node).

OVERVIEW

Various different handover process could be used to hand over a UE from a source access node to a target access node.

By way of example, one handover process could involve the source access node and target access node engaging in direct signaling with each other to coordinate the handover. For instance, the source access node could transmit a handover request message to a network address of the target access node, and the target access node could responsively prepare for the handover and then transmit a handover response message to a network address of the source access node. And the UE could thereafter transition from being served by the source access node to being served instead by the target access node. This type of handover process could be considered a direct, inter-access-node handover process.

Whereas, another handover process could involve the source access node and target access node each communicating with a core-network control system, rather than directly with each other, to coordinate the handover. For instance, rather than the source access node transmitting a handover request to a network address of the target access node, the source access node could transmit a handover required message to a network address of a core-network controller, and the core-network controller could then transmit a handover request to a network address of the target access node. Further, rather than the target access node transmitting a handover response message to a network address of the source access node, the target access node could transmit a handover response message to the core-network controller, and the core-network controller could then transmit a handover response message source access node. And the UE could then thereafter transition from being served by the source access node to being served by the target access node. This other type of handover process could be considered an indirect, controller-based handover process.

Other types of handover processes could be used as well.

In addition, as the wireless industry advances from one generation of wireless technology to the next, networks and UEs could be upgraded to support dual-connectivity, where a UE is connected concurrently with access nodes according to multiple RATs. With the transition from 4G to 5G, for instance, a wireless service provider that operates cell sites with 4G access nodes (e.g., evolved Node-Bs (eNBs)) could upgrade those cell sites to additionally include 5G access nodes (e.g., next generation Node-Bs (gNBs)) and could configure the access nodes of those cell sites to support 4G-5G dual-connectivity, at least one version of which is referred to as EUTRA-NR Dual Connectivity (EN-DC).

With dual-connectivity, one access node operating on one RAT could be configured to operate as a primary or master access node (MN) for dual-connectivity service, with all RRC signaling and core-network control signaling for a dual-connectivity-served UE being anchored at that access node, and with that access node being responsible for setup and teardown of the dual-connectivity service as well as other control operations such as UE handover. Whereas, another access node operating on another RAT could be configured to operate just as a secondary access node (SN) for the dual-connectivity service, to provide added bandwidth for supporting increased data throughput for instance.

With EN-DC, for instance, because 4G is the established legacy RAT, the 4G access node (legacy access node) of a cell site could be configured to operate as the MN for EN-DC service, and the added 5G access node of the cell site could be configured to operate as an SN for the EN-DC service.

In an example dual-connectivity implementation, a UE would initially scan for and discover threshold strong coverage of a cell site's MN (e.g., legacy, 4G access node) and would establish a connection (e.g., a 4G connection) with that MN as discussed above. The MN could then coordinate setup of dual-connectivity for the UE, by engaging in signaling with the UE, with the cell site's SN (e.g., 5G access node), and with a core-network controller. This setup process could result in establishing a secondary connection (e.g., 5G connection) between the SN and the UE and setup of a split bearer for the UE, so that the MN and SN could then concurrently serve the UE with wireless data communications over their respective connections with the UE.

As a wireless service provider upgrades its network to add service according to a new RAT and to support dual-connectivity service on that RAT together with a legacy RAT, the service provider may do so progressively from cell site to cell site. As a result, at least during that transition, some of the legacy access nodes in the provider's network may be configured to support dual-connectivity service (i.e., are dual-connectivity capable), while other legacy access nodes in the network may not be configured to support dual-connectivity service (i.e., are not dual-connectivity capable, and are perhaps just capable of providing service under the legacy RAT).

For instance, if a provider's network has cell sites with 4G access nodes, as the provider progressively upgrades those cell sites to add 5G access nodes and to configure the 4G access nodes to support EN-DC service, there may be a time when some of the 4G access nodes in the network are configured to support EN-DC service (i.e., are EN-DC capable) but other 4G access nodes in the network are not configured to support EN-DC service (i.e., are not EN-DC capable, and are perhaps just 4G capable).

In this scenario, when a UE is served by one of legacy access nodes in the provider's network and the UE is going to hand over to another one of the legacy access nodes in the network, that handover could be between access nodes that are both dual-connectivity capable or both not dual-connectivity capable. Or that handover could be between an access node that is dual-connectivity capable and an access node that is not dual-connectivity capable.

The present disclosure provides for selecting one of multiple handover processes to use for handover of a UE between a source access node and a target access node, with the selecting being based on whether the source access node and target access nodes are both dual-connectivity capable or both not dual-connectivity capable or rather that one of the access nodes is dual-connectivity capable and the other of the access nodes is not dual-connectivity capable.

For instance, if the source access node and target access node are both dual-connectivity capable or both not dual-connectivity capable, then, based on that fact, the source access node could opt to use direct inter-access-node handover, as the direct inter-access-node handover may work well between access nodes that are so similarly configured. Whereas, if one of the source access node and target access node is dual-connectivity capable and the other of the source access node and target access node is not dual-connectivity capable, then, based on that fact, the source access node could opt to use indirect controller-based handover, as that may work well for access nodes that are so differently configured.

In practice, the source access node could make this selection of handover process based on a comparison of its own capability and the capability of the target access node. For instance, the target access node's capability could be recorded in neighbor list maintained by the source access node, so the source access node could refer to that neighbor list to determine whether the target access node is dual-connectivity capable so as to then compare that with whether the source access node is dual-connectivity capable. Alternatively, the source access node could query a network entity, such as an element management system (EMS) to determine the target access node's capability so as to likewise compare that with whether the source access node is dual-connectivity capable. And the source access node could thereby select a handover process and could proceed accordingly to process handover of the UE.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE, 5G NR, and EN-DC service, and particularly in the context of a network that includes cell sites each having a 4G eNB but where only some of the 4G eNBs may be EN-DC capable. It should be understood, however, that the principles disclosed herein could extend to apply with respect to other scenarios as well, such as with respect to other RATs. Further, it should be understood that other variations from the specific arrangements and processes described are possible. For instance, various described entities, connections, functions, and other elements could be added, omitted, distributed, re-located, re-ordered, combined, or changed in other ways.

As noted above, FIG. 1 is a simplified block diagram of an example wireless communication system in which various disclosed features can be implemented. In particular, the figure depicts a representative arrangement including a first cell site 12 having a 4G eNB 14 and a second cell site 18 having a 4G eNB 20.

Figure 1:
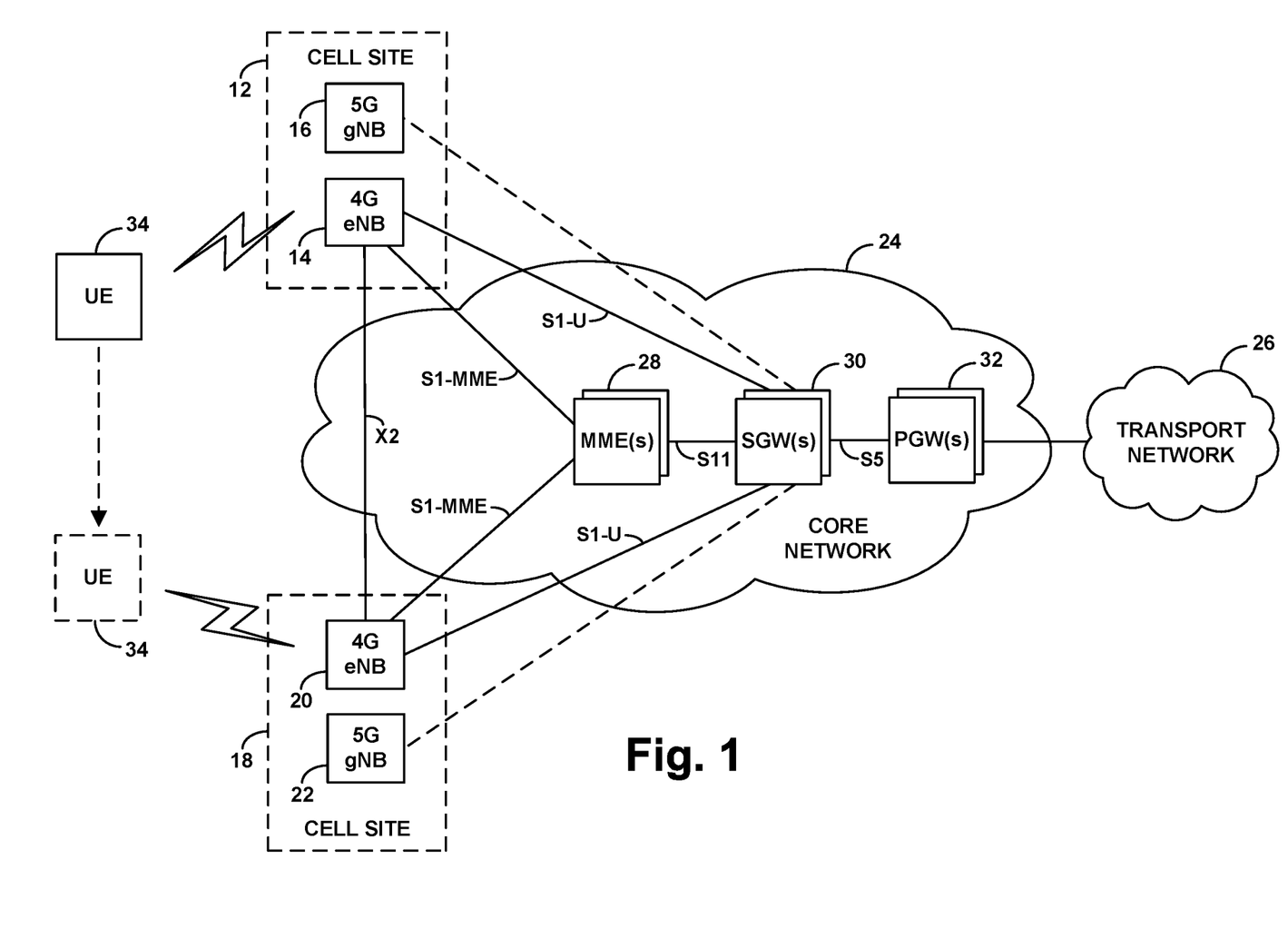
FIG. 1 is a simplified block diagram of an example wireless communication system in which aspects of the present disclosure can be implemented.

Cell site 12 may or may not also include a 5G gNB 16 and support EN-DC service. If cell site 12 includes 5G gNB 16 and supports EN-DC service, then 4G eNB 14 could be configured to be EN-DC capable. For instance, 4G eNB 14 could be programmed to function as an MN for EN-DC service, to set up and tear down EN-DC service for UEs when appropriate, and to function as the anchor point for RRC signaling and core-network control signaling as to UEs served with EN-DC service. Whereas, if cell site 12 does not include 5G gNB 16 and/or does not support EN-DC service, then 4G eNB 14 might not be configured to be EN-DC capable. For instance, 4G eNB 14 might not be programmed to function as an MN for EN-DC service.

Likewise, cell site 18 may or may not also include a 5G gNB 22 and support EN-DC service. If cell site 18 includes 5G gNB 22 and supports EN-DC service, then 4G eNB 20 could be configured to be EN-DC capable. For instance, 4G eNB 20 could be programmed to function as an MN for EN-DC service, to set up and tear down EN-DC service for UEs when appropriate, and to function as the anchor point for RRC signaling and core-network control signaling as to UEs served with EN-DC service. Whereas, if cell cite 18 does not include 5G gNB 22 and/or does not support EN-DC service, then 4G eNB 20 might not be configured to be EN-DC capable. For instance, 4G eNB 20 might not be programmed to function as an MN for EN-DC service.

(Note that these example cell sites might include a greater number of these access nodes and might also support one or more other RATs aside from these, such as one or more earlier RATs for instance. But the focus of the example discussion here will be just 4G and 5G.)

Each of these cell sites could be at a respective location within a region, and the two example cell sites could be adjacent to each other and provide overlapping coverage such that a UE served by one or more access nodes of one cell site might move from that cell site to another cell site and might then be served instead by one or more access nodes the other cell site.

In addition, each access node could also take various forms. For instance, an access node could be a macro access node of the type that would typically include a tower mounted antenna structure for providing a broad range of coverage. Or an access node could be a small cell access node, femtocell access node, relay access node, or other type of access node that might have a smaller form factor with an antenna structure that provides a narrower range of coverage. Further, if a cell site includes multiple access nodes, those access nodes might share an antenna structure and/or other equipment. Other arrangements are possible as well.

4G eNBs 14, 20 are each shown having communication interfaces on or through an example core network 24. Core network 24 could be an enhanced packet core (EPC) network, a next generation core (NGC) network, or another network including components supporting an applicable RAT and providing connectivity with at least one transport network 26, such as the Internet.

In an example implementation as shown, the core network 22 includes one or more mobility management entities (MMES) 28, one or more serving gateways (SGWs) 30, and one or more packet data network gateways (PGWs) 32. In operation, each 4G eNB could have an S1-MME signaling interface with an MME, and the MME could have an S11 signaling interface with an SGW. Further, each 4G eNB could have an S1-U interface with the SGW, the SGW could have an S5 interface with a PGW, and the PGW could provide connectivity with the transport network. Further, the two illustrated 4G eNBs could also have an X2 interface with each other. These or other such interfaces could be defined by 3GPP industry specifications by way of example.

With this arrangement, the SGW and PGW cooperatively provide user-plane connectivity between each eNB and the transport network, to enable a UE served by a eNB to engage in communication on the transport network. And the MME operates as a controller to carry out operations such as coordinating UE attachment and setup and management of user-plane bearers.

As noted above, the air interface between each access node and UEs within its coverage could be structured to define various air-interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the access node operates could be divided into subcarriers with specified subcarrier spacing on the order of 15 to 240 kHz. With this arrangement, the air interface on each carrier would define an array of resource elements each occupying a subcarrier and symbol time segment, and the access node and UEs could communicate with each other through modulation of the subcarriers to carry data in those resource elements. Variations of this arrangement are possible as well.

Further, particular sets of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the access node to UEs. And other resource elements per subframe could be reserved to define a shared channel in which PRBs could carry scheduled data communications from the access node to UEs.

Further, in certain subframes, a group of resource elements centered on the center frequency of each carrier could be reserved to carry synchronization signals that UEs could detect as a way to discover coverage of the access node on the carrier, to determine a physical cell identity (PCI) of the cell, and to establish frame timing. And in certain subframes, a group of resource elements also centered on the center frequency of the carrier could be reserved to define a broadcast-channel for carrying system information messages, such as master information block (MIB) and system information block (SIB) messages that UEs could read to obtain operational parameters such as carrier bandwidth (e.g., downlink bandwidth and/or uplink bandwidth) and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the access node. And other resource elements per subframe could be reserved to define a shared channel in which PRBs could carry scheduled data communications from UEs to the access node. Further, still other resources on the uplink could be reserved for other purposes as well, such as for carrying uplink reference signals or the like.

Note also that the 4G air interface and service provided respectively by a 4G eNB could differ from a 5G air interface and service provided by a 5G eNB in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

FIG. 1 additionally illustrates an example UE 34 that is initially within coverage of cell site 12 and that is moving or otherwise transitioning to coverage of cell site 18. This UE 34 could be configured to engage in 4G service and possibly 5G service and EN-DC service, among other possibilities.

In operation, the UE could initially scan for 4G coverage and detect the synchronization signal broadcast by 4G eNB 14 on a 4G carrier, and the UE could then read the MIB broadcast by 4G eNB 14 on that carrier to determine the carrier's bandwidth. The UE could then engage in random access signaling and RRC configuration signaling with 4G eNB 14 to connect with 4G eNB 14 on the carrier, thus putting the UE in an RRC-connected mode.

Once the UE is connected with 4G eNB 14, the UE could then transmit to 4G eNB 14 an attach request if appropriate, which the 4G eNB 14 could forward to an MME 28 for processing. And after authenticating the UE, the MME could coordinate or trigger setup for the UE of a user-plane bearer between the 4G eNB and a PGW 32, including an S1-U tunnel between the 4G eNB 14 and an SGW 30 and an S5 tunnel between the SGW and the PGW, to enable the UE to engage in communication on the transport network 26. Further, the 4G eNB 14 could coordinate establishment for the UE of a corresponding data radio bearer between the UE and the 4G eNB 14, and the 4G eNB 14 could establish a context record for the UE and record the UE's operational state.

The 4G eNB 14 could then serve the UE with data communications.

For instance, when data arrives at the 4G eNB 14 for transmission to the UE, the 4G eNB 14 could allocate one or more downlink PRBs in a subframe for use to transmit at least a portion of the data, defining a transport block, to the UE. The 4G eNB 14 could then transmit to the UE in the control region of that subframe a Downlink Control Information (DCI) message that designates the PRBs, and the 4G eNB 14 could accordingly transmit the transport block to the UE in those designated PRBs.

And when the UE has data to transmit to the 4G eNB 14 (e.g., for transmission on the transport network), the UE could transmit to the 4G eNB 14 a scheduling request that carries with it a buffer status report (BSR) indicating how much data the UE has buffered for transmission. And in response, the 4G eNB 14 could allocate one or more uplink PRBs in an upcoming subframe for carrying a transport block of that data from the UE and could transmit to the UE a DCI message that designates those upcoming PRBs. The UE could then accordingly transmit the transport block to the 4G eNB 14 in those designated PRBs.

If the 4G eNB 14 is EN-DC capable, then the 4G eNB 14 might next coordinate setup of EN-DC service for the UE. For instance, the 4G eNB 14 could engage in signaling with the 5G gNB 16 and the UE to coordinate setup of a secondary connection between the 5G gNB 16 and the UE, and 4G eNB 14 could engage in signaling with the MME and the 5G gNB 16 to coordinate modification of the UE's established bearer and establishment of a split bearer. 4G eNB 14 and 5G gNB 16 could then serve the UE concurrently over their respective connections with the UE, each in the manner discussed above for instance.

While the UE is served by 4G eNB 14, with or without EN-DC service, the UE could also continue to monitor 4G coverage to trigger possible 4G handover when appropriate. To facilitate this, the UE might be provisioned to monitor for the occurrence of various measurement events and to report to its serving 4G eNB 14 when the UE detects the occurrence of such events. For instance, the UE might be provisioned to detect and report when reference signal strength from 4G eNB 14 becomes lower than a predefined threshold and to detect and report when reference signal strength from a neighboring 4G eNB becomes higher than a predefined threshold and/or predefined threshold higher than reference signal strength from serving 4G eNB 14.

In the context of FIG. 1, as the UE moves from coverage of cell site 12 to coverage of cell site 18, the UE may thus detect and report to serving 4G eNB 14 that reference signal strength from 4G eNB 20 of cell site 18 has become predefined threshold stronger than reference signal strength from serving 4G eNB 14. The UE could include in its measurement report an identifier of the detected cell of 4G eNB 20 and an indication of the measurement event. And in response, serving 4G eNB 14 could then initiate handover processing to hand over UE from being served by 4G eNB 14 to instead being served by 4G eNB 20. Other triggers for handover could be possible as well.

As noted above, the handover process that is then used to coordinate handover of the UE from being served by 4G eNB 14 (source eNB) to being served by 4G eNB 20 (target eNB) could be a direct inter-access-node handover process or an indirect controller-based handover process. More particularly in the context of FIG. 1, the handover could be X2 handover or S1 handover.

In an example implementation of X2 handover, the source eNB and target eNB would engage in direct handover signaling with each other over their X2 interface. When the source eNB receives the UE's measurement report identifying the detected cell of the target eNB, the source eNB could refer to neighbor data to determine the IP address of the target eNB and could then transmit to that IP address an X2-AP handover request message, identifying the UE and providing information about the UE's established bearer. The target eNB could then respond to the source eNB with an X2-AP handover request acknowledge message, providing tunnel information for carrying data directly between the eNBs during the handover, and providing a handover command message (HCM) (e.g., RRC connection reconfiguration request message) that the source access node could transparently forward to the UE. Further, the target eNB could allocate radio resources for the UE, establish a UE context record, and provide in the HCM a C— RNTI for an RRC connection, and the target eNB could provide a contention-free random access preamble that the UE could use to facilitate readily connecting with the target eNB.

As the UE then responsively connects with the target eNB, the target eNB in this X2 handover process could further send a path-switch request to the MME, and the MME could responsively engage in signaling to transfer the UE's S1-U tunnel from the source eNB to the target eNB. And the target eNB could then signal to the source eNB to cause the source eNB to release UE context, largely completing the X2 handover process.

In an example implementation of S1 handover, on the other hand, the source eNB and target eNB engage in signaling with and through the MME to effect the handover. When the source eNB receives the UE's measurement report identifying the detected cell of the target eNB, the source eNB could send an S1-AP handover required message to the MME, providing information about which the UE's bearer tunnel available for data forwarding via the SGW. The MME could then send a handover request message to the target eNB, providing S1 bearer tunnel information to facilitate tunneling between the SGW and the target eNB. In response to this handover request message from the MME, the target eNB could then allocate radio resources for the UE, establish a UE context record, and assign a C-RNTI for an RRC connection. And the target eNB could respond to the MME with an S1-AP handover request acknowledgement, which provides an HCM (e.g., RRC connection reconfiguration request message) and bearer tunnel information.

The MME could then engage in signaling with the SGW to cause the SGW to establish an indirect tunnel for data forwarding during the handover, so that downlink data arriving at the source eNB can be forwarded to the SGW and from the SGW to the target eNB for ultimate transmission to the UE. Further, the MME could forward the HCM to the source eNB, and the source eNB could forward the HCM to the UE. The UE could then responsively connect with the target eNB and send to the target eNB an RRC connection reconfiguration complete message, largely completing the S1 handover process.

To facilitate either of these handover processes, the source eNB could maintain neighbor list data that lists various neighboring cells, specifying for each neighboring cell the cell's PCI, a globally unique identifier such as enhanced cell global identity (ECGI), and perhaps an IP address of the associated eNB. When the UE provides a measurement report specifying the identity of a detected target cell, the source eNB could then refer to its neighbor list data to identify information about the reported target cell, to facilitate handover of the UE to that cell.

If X2 handover will be used, for instance, the source eNB might determine the target eNB's IP address so as to engage in X2-AP signaling with the target access node. Whereas, if S1 handover will be used, the source eNB might determine the target cell's ECGI and provide the ECGI among other information in its S1-AP signaling to the MME, so that the MME can engage in signaling with the proper target eNB. Other examples are possible as well.

In line with the discussion above, source eNB 14 could select between use of X2 handover and S1 handover, with the selecting being based on whether the source eNB 14 and target eNB 20 are both EN-DC capable or both not EN-DC capable or rather that one of the source eNB 14 and target eNB 20 is EN-DC capable and the other is not EN-DC capable. For instance, if both of the eNBs are EN-DC cable or both of the eNBs are not EN-DC capable, then, based that fact, source eNB 14 could opt for X2 handover rather than S1 handover. Whereas, if one of the eNBs is EN-DC capable and the other is not EN-DC capable, then, based on that fact, source eNB 14 could opt for S1 handover rather than X2 handover.

To facilitate this selection, the neighbor data maintained by the source eNB 14 could indicate whether target eNB 20 is EN-DC capable. For instance, the neighbor data could be provisioned with this indication by engineering input and/or through an automated process based on network configuration. The source eNB 14 could thus refer to the neighbor data to determine whether the target eNB 20 is EN-DC capable or not. Alternatively, the source eNB 14 could query an EMS or other such entity that might provide this information. Further, the source eNB 14 could have a record of whether it itself is EN-DC capable.

With this information, the source eNB could thus determine whether both it and the target eNB are EN-DC capable or are not EN-DC capable or rather that one is EN-DC capable and the other is not, and the source eNB could then accordingly select between X2 handover and S1 handover and/or between other types handover processes. The source eNB could then proceed to initiate and engage in handover of the UE to target eNB according to the selected handover process.

Note also that, if the UE is served with EN-DC in cell site 12 and if cell site 18 also supports EN-DC, source 4G eNB 14 might tear down the UE's EN-DC configuration in cell site 12, and target 4G eNB might then configure EN-DC service for the UE in cell site 18.

Figure 2:
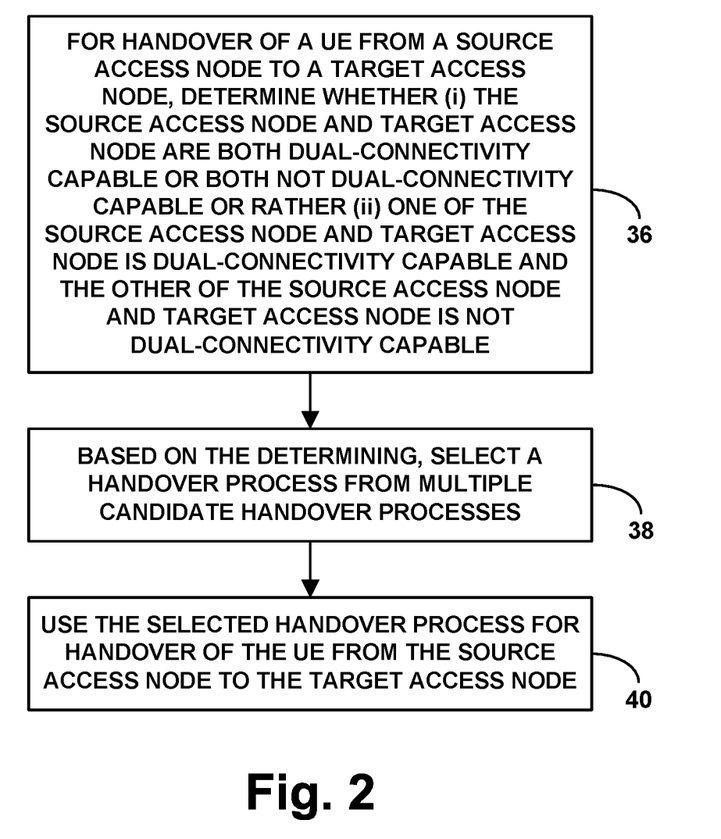
FIG. 2 is a flow chart depicting operations that can be carried out in an example implementation.

FIG. 2 is a flow chart depicting a method that can be carried out in accordance with the present disclosure, to control handover of a UE from a source access node (e.g., a 4G eNB) to a target access node (e.g., another 4G eNB). This method could be carried out by the source access node, perhaps in response to receipt from the UE of a measurement report indicating that the UE has detected threshold strong coverage of the target access node, among other possibilities.

As shown in FIG. 2, at block 36, the method includes determining whether (i) the source access node and target access node are both dual-connectivity capable (e.g., EN-DC-capable) or both not dual-connectivity capable or rather (i) one of the source access node and target access node is dual-connectivity capable and the other of the source access node and target access node is not dual-connectivity capable. At block 38, the method then includes, based on the determining, selecting a handover process from multiple candidate handover processes. And at block 40, the method includes using the selected handover process for handover of the UE from the source access node to the target access node.

In line with the discussion above, the act of selecting a handover process based on the determining could involve (a) if the source access node and target access node are both dual-connectivity capable or both not dual-connectivity capable, then selecting an inter-access-node handover process such as X2 handover rather than a controller-based handover process such as S1 handover and (b) if one of the source access node and target access node is dual-connectivity capable and the other of the source access node and target access node is not dual-connectivity capable, then selecting the controller-based handover process rather than the inter-access-node handover process.

Further, as discussed above, the inter-access-node based handover process could involve communication of handover request and response signaling directly between the source access node the target access node (e.g., from an IP address of one to an IP address of the other), whereas the controller-based handover process could involve communication of handover signaling through a core-network controller instead of handover request and response signaling passing directly between the source access node the target access node.

In addition, as discussed above, the act of determining whether the (i) the source access node and target access node are both dual-connectivity capable or both not dual-connectivity capable or rather (i) one of the source access node and target access node is dual-connectivity capable and the other of the source access node and target access node is not dual-connectivity capable could involve referring to neighbor data to determine whether the target access node is dual-connectivity capable and/or could involve querying a network entity (e.g., an EMS or perhaps the target access node, among other possibilities) to determine whether the target access node is dual-connectivity capable.

As additionally discussed above, in this process, an access node being dual-connectivity capable could include the access node being programmed to operate as a master node for dual-connectivity service, whereas an access node not being dual-connectivity capable could include the access node not being programmed to operate as a master node for dual-connectivity service.

Figure 3:
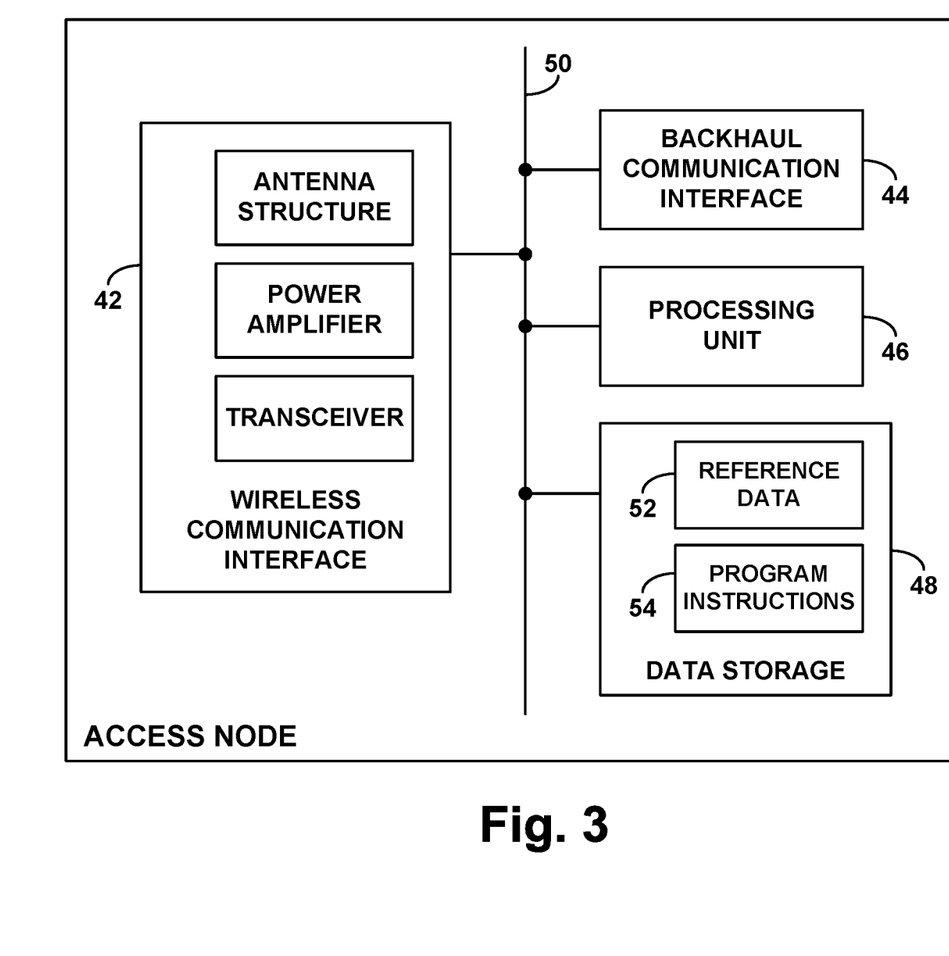
FIG. 3 is simplified block diagram of an example base station operable in accordance with the disclosure.

FIG. 3 is next a simplified block diagram of an example access node (e.g., 4G eNB) that could operate as discussed above. As shown the example access node includes a wireless communication interface 42, a backhaul communication interface 44, a processing unit 46, and non-transitory data storage 48, all of which could be integrated together in various ways (e.g., on a chipset) and/or interconnected by a system bus, network, or other communication mechanism 50 as shown.

The wireless communication interface 42 could include a transceiver configured to serve UEs in accordance with one or more agreed RATs, along with a power amplifier and antenna structure through which to engage in air interface communication with served UEs. And the backhaul wireless communication interface 44 could then comprise a wired or wireless network communication module, such as an Ethernet interface, through which to communicate with other entities.

Further, the processing unit 46 could comprise one or more general purpose processors (e.g., microprocessors) and/or one or more special purpose processors (e.g., application specific integrated circuits). And the non-transitory data storage 36 could comprise one or more volatile and/or non-volatile storage components, such as magnetic, optical, and/or flash storage. As shown, the data storage could then hold various reference data 52 and program instructions 54. The reference data 52 could include data such as neighbor data as discussed above. And the program instructions 54 could be executable by the processing unit 46 to carry out various access node operations described herein and/or to cause the access node to carry out such operations.

Various features described above can be implemented in this context as well, and vice versa.

Exemplary embodiments have been described above. Those skilled in the art will understand, however, that changes and modifications may be made to these embodiments without departing from the true scope and spirit of the invention.

We claim:

1. A method for controlling handover of a user equipment device (UE) from a source access node to a target access node, the method comprising:
    determining whether (i) the source access node and target access node are both dual-connectivity capable or both not dual-connectivity capable or rather (ii) one of the source access node and target access node is dual-connectivity capable and the other of the source access node and target access node is not dual-connectivity capable;
    based on the determining, selecting a handover process from multiple candidate handover processes, wherein selecting the handover process based on the determining comprises (i) if the source access node and target access node are both dual-connectivity capable or both not dual-connectivity capable, then selecting an inter-access-node handover process rather than a controller-based handover process, whereas (ii) if one of the source access node and target access node is dual-connectivity capable and the other of the source access node and target access node is not dual-connectivity capable, then selecting the controller-based handover process rather than the inter-access-node handover process; and
    using the selected handover process for handover of the UE from the source access node to the target access node.

2. The method of claim 1, wherein the inter-access-node based handover process comprises communication of handover request and response signaling directly between the source access node the target access node, and wherein the controller-based handover process comprises handover signaling through a core-network controller instead of handover request and response signaling directly between the source access node the target access node.

3. The method of claim 1, wherein the inter-access-node handover process is X2 handover and the controller-based handover process is S1 handover.

4. The method of claim 1, carried out by the source access node.

5. The method of claim 4, carried out in response to receipt from the UE of a measurement report indicating that the UE has detected threshold strong coverage of the target access node.

6. The method of claim 4, wherein the determining comprises referring to neighbor data to determine whether the target access node is dual-connectivity capable.

7. The method of claim 1, wherein the determining comprises querying a network entity to determine whether the target access node is dual-connectivity capable.

8. The method of claim 1, wherein being dual-connectivity capable includes being programmed to operate as a master node for dual-connectivity service, and not being dual-connectivity capable includes not being programmed to operate as a master node for dual-connectivity service.

9. The method of claim 7, wherein the source access node and target access node are each a respective 4G LTE evolved Node-B (eNB), and wherein the dual-connectivity service comprises EUTRA-NR Dual Connectivity (EN-DC) service.

10. In a wireless communication system including first and second access nodes, wherein each access node provides a respective wireless coverage area, the first access node comprising:
a wireless communication interface, including an antenna structure, through which to engage in air interface communication with user equipment devices (UEs);
a backhaul communication interface through which to communicate on a core network;
a processing unit;
non-transitory data storage;
program instructions stored in the non-transitory data storage and executable by the processing unit to carry out operations to control handover of UE from being served by the first access node to being served by the second access node, the operations including:
determining whether (i) the first access node and second access node are both dual-connectivity capable or both not dual-connectivity capable or rather (ii) one of the first access node and second access node is dual-connectivity capable and the other of the first access node and second access node is not dual-connectivity capable,
based on the determining, selecting a handover process from multiple candidate handover processes, wherein selecting the handover process based on the determining comprises (i) if the source access node and target access node are both dual-connectivity capable or both not dual-connectivity capable, then selecting an inter-access-node handover process rather than a controller-based handover process, whereas (ii) if one of the source access node and target access node is dual-connectivity capable and the other of the source access node and target access node is not dual-connectivity capable, then selecting the controller-based handover process rather than the inter-access-node handover process, and
causing the first access node to use the selected handover process for handover of the UE from the source access node to the target access node.

11. The first access node of claim 10, wherein the inter-access-node based handover process comprises communication of handover request and response signaling directly between the first access node the second access node, and wherein the controller-based handover process comprises handover signaling through a core-network controller instead of handover request and response signaling directly between the first access node the second access node.

12. The first access node of claim 10, wherein the inter-access-node handover process is X2 handover and the controller-based handover process is S1 handover.

13. The first access node of claim 10, carried out by the first access node.

14. The first access node of claim 13, carried out in response to receipt from the UE of a measurement report indicating that the UE has detected threshold strong coverage of the second access node.

15. The first access node of claim 13, wherein the determining comprises referring to neighbor data to determine whether the second access node is dual-connectivity capable.

16. The first access node of claim 10, wherein the determining comprises querying a network entity to determine whether the second access node is dual-connectivity capable.

17. The first access node of claim 10, wherein being dual-connectivity capable includes being programmed to operate as a master node for dual-connectivity service, and not being dual-connectivity capable includes not being programmed to operate as a master node for dual-connectivity service.

18. The first access node of claim 16, wherein the first access node and second access node are each a respective 4G LTE evolved Node-B (eNB), and wherein the dual-connectivity service comprises EUTRA-NR Dual Connectivity (EN-DC) service.

* * * * *